United States Patent [19]

Masters

[11] Patent Number: 5,419,123
[45] Date of Patent: May 30, 1995

[54] EMISSION CONTROL DEVICE AND METHOD

[75] Inventor: Ben F. Masters, Gastonia, N.C.

[73] Assignee: Unlimited Technologies, Inc., Lowell, N.C.

[21] Appl. No.: 209,922

[22] Filed: Mar. 17, 1994

Related U.S. Application Data

[63] Continuation-in-part of Ser. No. 38,475, Mar. 29, 1993.

[51] Int. Cl.⁶ ............................................. F01N 3/20
[52] U.S. Cl. ........................................ 60/274; 60/275; 60/284; 60/286; 60/297; 60/300; 60/303; 422/171; 422/174
[58] Field of Search .................. 60/274, 275, 286, 300, 60/303, 284, 297; 422/174, 171

[56] References Cited

U.S. PATENT DOCUMENTS

| | | | |
|---|---|---|---|
| 2,981,057 | 4/1961 | Buttler | 60/303 |
| 3,043,096 | 7/1962 | McLoughlin | 60/300 |
| 3,228,755 | 1/1966 | Lottinville | 60/275 |
| 3,263,412 | 8/1966 | Thompson | 60/303 |
| 4,441,971 | 4/1984 | Ishiguro | 60/275 |
| 5,146,743 | 9/1992 | Maus | 60/284 |
| 5,199,257 | 4/1993 | Colletta | 60/275 |

*Primary Examiner*—Douglas Hart
*Attorney, Agent, or Firm*—Dority & Manning

[57] ABSTRACT

An emission control device and method are provided for treating exhaust gases to reduce pollutants contained therein. The device includes a treatment chamber through which the exhaust gases pass. First and second metal screens are disposed within the chamber a predetermined distance from each other. A section of chemical substrate is disposed between the screens. Voltage is supplied to adjacent the first screen with, for example, an electrode device. A timing circuit is provided for pulsing the voltage at a predetermined pulse rate. A temperature sensitive device may be interfaced with the treatment chamber and timing circuit so that the pulsed voltage is only supplied to the screen within a predetermined temperature range.

25 Claims, 4 Drawing Sheets

EMISSION CONTROL DEVICE AND METHOD

This application is a Continuation-in-Part application of U.S. Ser. No. 08/038,475 filed Mar. 29, 1993.

BACKGROUND OF THE INVENTION

The present invention relates generally to an apparatus and method for treating exhaust gases, and more particularly to a combustion engine treatment device for removing and/or reducing pollutants contained in the combustion engine effluent gases. In particular, the present invention substantially reduces carbon dioxide and hydrocarbons and virtually eliminates the exhaust of carbon monoxide.

With the increasing use of automobiles, trucks, aircraft, and other combustion engine vehicles, growing concern over the gaseous pollutants emitted by these sources is justifiably mounting. Carbon monoxide, the toxic by-product of incomplete combustion, is a major contributor to air pollution and poses a very real threat to public health. Carbon dioxide, although non-toxic, is recognized as an air pollutant that directly causes the "greenhouse effect." Modern fuels generate excessive amounts of carbon dioxide, which scientists report are contaminating the atmosphere worldwide. Today's engines also generate an unhealthy amount of toxic hydrocarbons which are generally responsible for eye irritation, nasal congestion, and breathing difficulties.

In addition to the problems caused by exhaust emissions from automotive combustion engines, significant exhaust pollution is also created from residential and industrial effluent stacks. Electrostatic precipitators and the like are common in the treatment of automotive, stack, and other industrial gases. However, the conventional treatment devices are inadequate for treating the principle concerns of carbon dioxide and carbon monoxide concentrations in the exhaust gases.

Numerous devices and methods are known in the art for the control of exhaust gas contaminants. Electrostatic precipitation is widely used in such applications and involves the application of high voltages to electrodes positioned in the exhaust gas stream. This process induces ionization of gas particles, which in turn cause particulates suspended in the gas to acquire a charge from contact with the ionized gas particles. The charged particles are then collected at oppositely charged diodes, which must be eventually "cleaned" or "scrubbed." A significant drawback of electrostatic precipitation is that only minute particulate matter can be precipitated out of the exhaust stream. The process is ineffective at removing gaseous contaminants such as carbon monoxide and carbon dioxide.

The method and apparatus of the present invention represent a further technique for treatment of industrial, automotive, and other exhaust emissions to realize enhanced reduction or elimination of gaseous pollutants, particularly carbon monoxide and carbon dioxide. The prior art neither teaches nor suggests the method or apparatus according to the present invention.

OBJECTS AND SUMMARY OF THE INVENTION

A principle of the present invention is to provide a device for treatment of exhaust gases for the reduction of atmospheric gaseous pollutants contained therein.

Another object of the present invention is to provide a method for treating exhaust gases for the reduction of atmospheric gaseous pollutants contained therein.

Still a further object of the present invention is to provide an emission control device which substantially reduces carbon dioxide and hydrocarbons and virtually eliminates carbon monoxide from exhaust gases, particularly automobile exhaust gases.

Another object of the present invention is to provide a device which can be retro-fitted into an automobile's exhaust system for significantly reducing gaseous pollutants contained in the exhaust stream.

Still a further object of the present invention is to provide an improved exhaust treatment system and method for residential and industrial use.

Additional objects and advantages of the present invention will be set forth in part in the description which follows, and in part will be obvious from the description, or may be learned by practice of the invention. The objects and advantages of the invention may be realized and attained by means of the instrumentalities and combinations particularly pointed out in the appended claims. Various modifications and alterations to the features, elements, and constructions disclosed herein may occur to those of ordinary skill in the art, and are intended to come within the spirit and scope of this invention. Such modifications and variations may include, but are not limited to, the substitution of functionally equivalent structures and elements for those expressly disclosed, illustrated, or suggested herein.

According to the objects of the invention, a system for treating exhaust gases for reducing pollutants therein is provided. The system comprises a treatment chamber having an intake end and an exhaust end. A first metal screen, preferably comprised of stainless steel, is operatively disposed within the treatment chamber generally near the intake end. A second metal screen, also preferably formed of stainless steel, is disposed within the treatment chamber at a predetermined distance from the first metal screen and generally near the exhaust end of the treatment chamber. An alternating voltage source is operatively disposed adjacent to at least the first metal screen within the treatment chamber for supplying cycling voltage thereto. Means are provided for pulsing the voltage supplied to the first metal screen at a predetermined frequency which maximizes reduction of gaseous pollutants within an exhaust gas stream passing through the first and second metal screens within the treatment chamber. The voltage is "supplied" to the first screen in the sense that an electrode or like device is disposed adjacent the screen and with each pulse of voltage, an arc is generated from the electrode to the screen.

In a preferred embodiment of the invention, temperature sensitive means, such as a thermocouple, are operatively disposed to sense the temperature within the treatment chamber. The temperature sensitive means are operatively interfaced with the pulsing means so that the pulsed voltage is supplied to the first metal screen within a predetermined temperature range. Applicants have found that an optimum temperature range is approximately 150° to 300° F. It should be understood that the optimum temperature range may vary due to any combination of elements and also depending upon the particular gaseous pollutant most desired to be reduced from the exhaust stream. The temperature range of approximately 150° to 300° is thus not a limitation to the present invention, but only a preferred embodiment thereof.

And in still a further preferred embodiment of the invention, voltage is supplied to the first metal screen at a pulse frequency of 1500 pulses/minute to optimize reduction of at least carbon monoxide, hydrocarbons, and carbon dioxide.

In a preferred embodiment, the system according to the present invention is designed for use with an automobile's exhaust system. In this embodiment, the treatment chamber may be placed within the auto's exhaust system, for example, by being inserted into the end of the exhaust pipe or otherwise placed in-line within the exhaust pipe. The voltage source may preferably comprise components of the car's existing electrical system, for example the ignition coil system is preferred for producing voltage of generally at least 15K volts. The pulsing means may comprise a conventional timing circuit interfaced with the auto's electrical system for supplying the voltage to the first screen at the predetermined pulse rate. Preferably, a thermalcouple or other temperature sensitive device is operatively disposed to sense the temperature within the treatment chamber and is interfaced with the timing circuit so that the pulsed voltage is supplied to the first metal screen only within a predetermined temperature range.

In a preferred arrangement of the metal screens within the treatment chamber, applicants have determined that a distance of approximately six inches between the screens is effective for reducing at least carbon monoxide, carbon dioxide, and hydrocarbons. However, as with the temperature range, the distance between the screens may vary depending upon any number of factors and pollutants desired to be eliminated. Thus, the six inch distance is not a limitation, but merely a preferred embodiment of the invention.

Also in another preferred embodiment of the invention, the chamber and first and second metal screens are multi-sided in configuration, such as a star shape, or the like. Although a substantially round configuration of the treatment chamber and metal screens is within the scope of the present invention, the multi-sided configuration, such as the star shape, is preferred for more efficiently dissipating heat generated within the treatment chamber.

It should be further understood that the use of the system with an automobile is but a preferred use of the invention. It is within the scope and spirit of the invention to use the present system for treatment of any manner of effluent exhaust gases, such as industrial stack gases, locomotives, or any manner of combustion engine exhaust streams.

In further accordance with the objects of the present invention, a method is provided for treating exhaust gases to reduce the pollutant contained therein. The method comprises the steps of passing the exhaust gases through a treatment chamber having first and second steel screens disposed therein separated from each other a predetermined distance. The exhaust gases thus passed through the first screen and then through the second screen within the treatment chamber. The method further includes supplying voltage to the first steel screen within the treatment chamber. Also, the voltage is supplied in pulses to the first steel screen at a predetermined pulse frequency. The method further includes supplying the pulsed voltage to the screen within a predetermined temperature range which is measured within the treatment chamber. In a preferred embodiment of the present method, the volts supplied to the screen are in the magnitude of approximately 15K volts. In one preferred embodiment, the volts are pulsed at a rate of approximately 1500 pulses/minute. Also, one preferred temperature range for supplying the pulsed voltage is approximately 150° to 300° F.

BRIEF DESCRIPTION OF THE DRAWINGS

The accompanying drawings, which are incorporated in and constitute a part of the specification, illustrate embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

Figure 1:
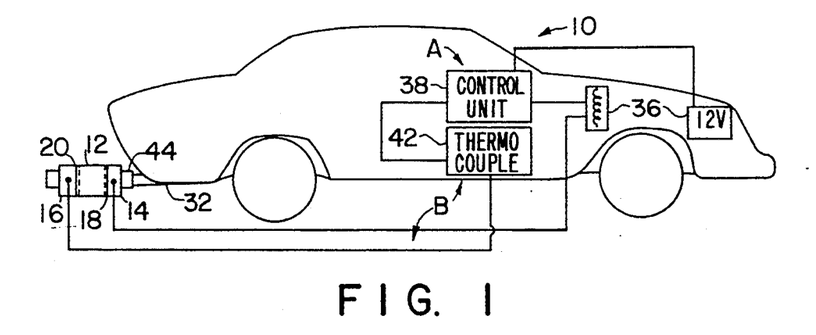
FIG. 1 is a diagrammatic view of an embodiment of the present invention shown in use as an emission control device for an automobile.
Figure 2:
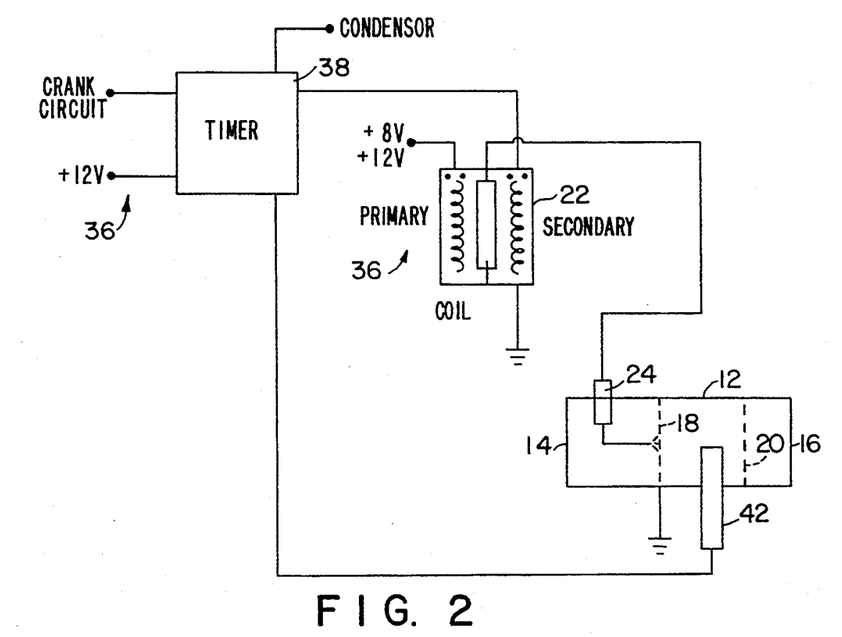
FIG. 2 is a diagrammatic component view of the system according to the present invention.

The system for treating exhaust gases for reducing pollutants contained therein is shown generally in the figures as numeral 10. Referring to FIG. 1 in general, system 10 comprises a treatment chamber 12 having an intake end 14 and an exhaust end 16. A first metal screen 18 is disposed within the treatment chamber 12 generally near intake end 14. Second metal screen 20 is disposed within treatment chamber 12 a predetermined distance from first metal screen 18. A voltage source 22 is operatively connected to at least first metal screen 18 through, for example, an electrode 24 as shown in FIG. 2. System 10 further includes pulsing means A for pulsing the voltage supplied to first metal screen 18 at a predetermined optimum frequency.

Figure 3:
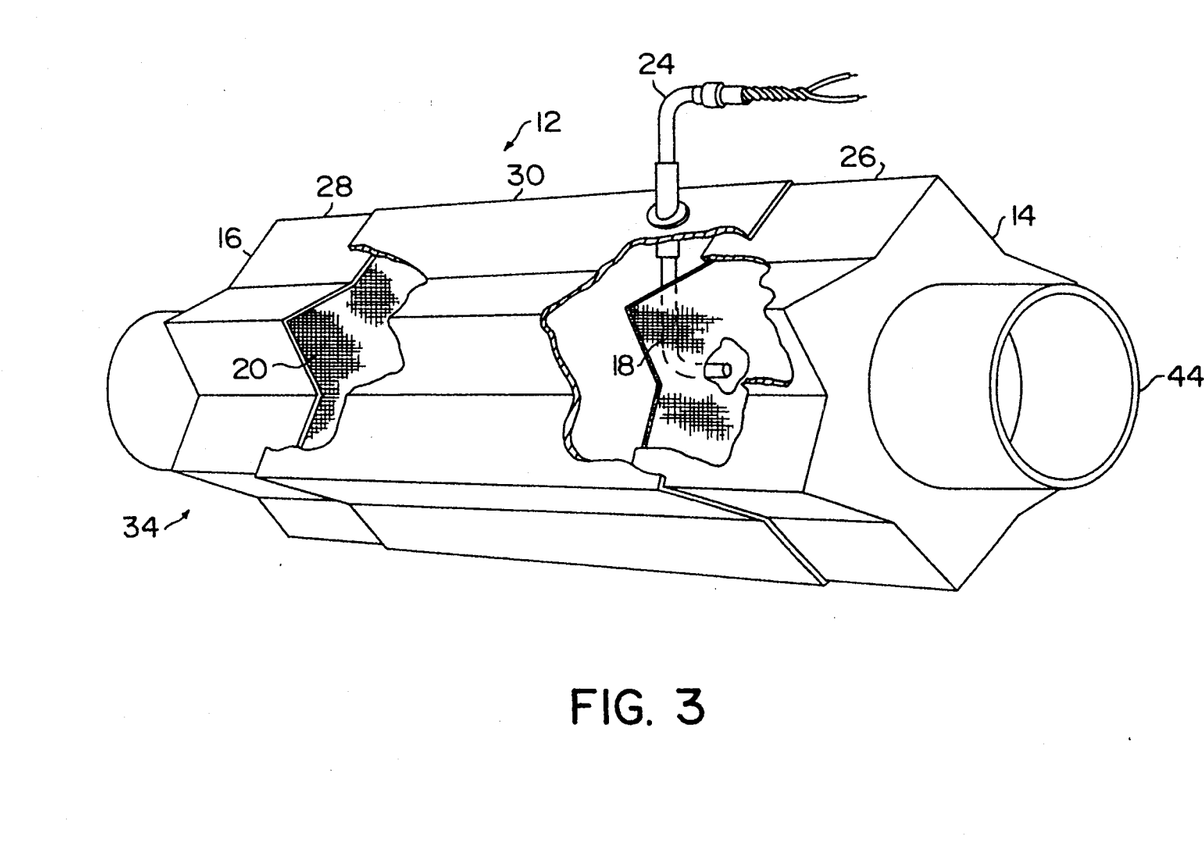
FIG. 3 is a perspective view shown in partial cutaway of the treatment chamber according to the present invention.

Referring to FIGS. 2 and 3 in particular, chamber 12 preferably comprises a multi-sided configuration 34. For example, in one preferred embodiment illustrated in FIG. 3 chamber 12 is of a star configuration. Although any number of arrangements of chamber 12 are possible, in the embodiment illustrated in FIG. 3, chamber 12 includes a central sleeve member 30. A first insert section 26 and a second insert section 28 are fitted into central sleeve member 30. First metal screen 18 is disposed within first insert section 26 and, likewise, second metal screen 20 is disposed within second insert section 28. Thus, central sleeve 30 separates the metal screens a predetermined distance. Inserts 26 and 28 can be secured to sleeve member 30 by any conventional means, such as welding, epoxy, or the like. It is preferred that chamber 12 be fabricated from stainless steel. In one preferred embodiment, inserts 26 and 28 and sleeve member 30 are formed of 16 gauge type 306 stainless steel. Likewise, it is also preferred that first and second metal screens 18 and 20 respectively are also formed of stainless steel. In one preferred embodiment the screens are formed of 8 mesh 0.032 wire screen of type 316 stainless steel.

Electrode 24 is disposed within chamber 12 adjacent first screen 18. Electrode 24 may be disposed through sleeve member 30 as shown in FIG. 3, or may be disposed through insert section 26 towards screen 18. Electrode 24 may comprise a simple length of copper rod or a conventional ignition device disposed, for example, ¼ inch from screen 18. When voltage is supplied to electrode 24, a spark is generated across the gap between the electrode and the screen exciting the metallic surface area of the screen.

Figure 1A:
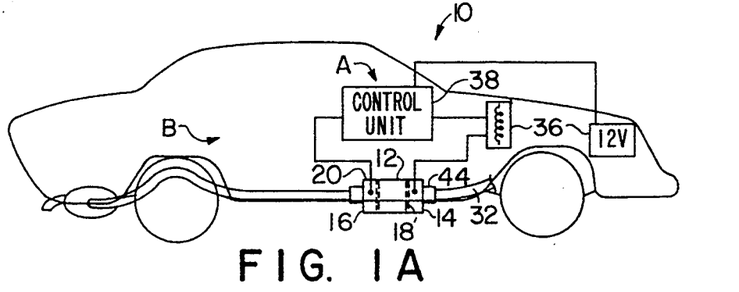
FIG. 1a is a diagrammatic of an alternative embodiment of the present invention shown in use as an emission control device for an automobile.

Chamber 12 may also be provided with an insert or extension section 44 which can be easily mated with the existing exhaust pipe of an automobile, as shown generally in FIG. 1. Extension or insert 44 may either fit over the exhaust pipe or slide into the exhaust pipe. Any manner of connections for mating chamber 12 to the exhaust system are within the scope and spirit of the invention. For example, chamber 12 need not necessarily be placed at the extreme end of the exhaust pipe as shown in FIG. 1, but may be placed generally anywhere in-line in the exhaust system. For example, a section of exhaust could be replaced with the treatment chamber 12, as shown in FIG. 1a wherein chamber 12 is disposed between the muffler and engine.

In operation, exhaust gases flow into chamber 12 through intake end 44, pass through first screen 18, and then through second screen 20 before exiting chamber 12 through exhaust end 16.

Referring to FIGS. 1 and 3 in particular, in the embodiment where the present system 10 is used as an emission control device for an automobile, central sleeve member 30 is approximately 6½ inches long and first and second insert sections 26 and 28 are approximately 3 inches long. The diameter of the insert sections is approximately 3.8 inches, which is slightly less than the diameter of sleeve member 30. In this embodiment, applicants have determined that for effective elimination of carbon monoxide, carbon dioxide, and hydrocarbons from the automobile's exhaust, that a separation of approximately 6 inches between first screen 18 and second screen 20 is preferred. However, it should be understood that the predetermined distance between the distance can vary depending on any number of factors including physical dimensions of treatment chamber 12 and the volumetric flow rate of gases through the chamber.

In the embodiments illustrated, voltage source 22 comprises components of the automobile's existing electrical system, such as the ignition device or coil circuitry. The operation of an automobile's electrical system, particularly the 12 volt dc supply and ignition system is not particular to the present invention and need not be explained in detail here. Utilization of the automobile's existing system is preferred in that this is the least obtrusive manner of implementing the present invention with an automobile. As shown in FIGS. 1 and 2, in one preferred embodiment voltage is supplied to first metal screen 18 from the engine's ignition coil circuitry 22. In a preferred embodiment, 15K volts are supplied from the ignition coil system to first metal screen 18 through electrode 24.

According to the invention, the voltage supplied to the first screen is pulsed at a predetermined frequency which has been optimally determined to maximize the reduction of exhaust pollutants within the chamber. Thus, timing circuit 38 is provided interfaced with the engine's electrical system as diagrammatically indicated in FIGS. 1 and 2. In the embodiment illustrated in FIG. 2, timing circuit 38 controls the frequency of pulses of voltage to electrode 24 by controlling the voltage to the secondary windings of the ignition coil. It should be understood, however, that this is but a mere example of any suitable arrangement of a timing circuit interfaced with the engine's electrical system. Any number of conventional timing circuits may be utilized and any number of arrangements of timing circuits with appropriate relays can be utilized to achieve the same result. Although pulsation of the voltage to first screen 18 is important to the present invention, the method of providing such pulsation can vary in any number of ways and applicant wishes not to be limited to the examples shown in the figures.

Figure 4:
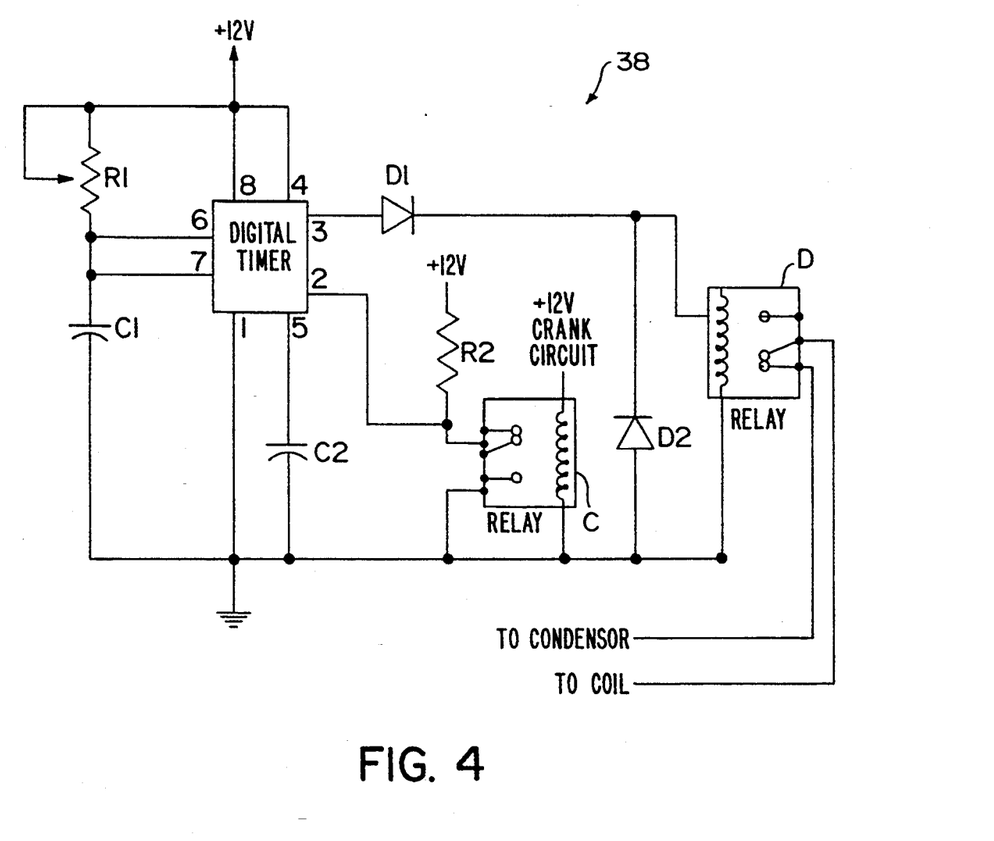
FIG. 4 is an electrical circuit of one embodiment of the timing circuit according to the present invention.

As mentioned, any number of commercially available timing circuits may be incorporated in the present system. However, in FIG. 4 applicant has illustrated a suitable timing circuit designed particularly for use with the present invention. According to FIG. 4, a digital timer, such as a 555 digital timer, is provided being supplied 12 volt power through pin 8 from the engine's battery or dc system. Pin 1 of the digital timer is to ground. Resistor R1 is disposed between pins 4 and 6 and capacitor C1 is disposed between pins 7 and 1 of the timer. Resistor R1 and capacitor C1 are chosen and cooperate to establish the pulsing frequency of the digital timer, as is commonly understood in the electrical arts. An initiation relay C is provided for initiating the pulsing sequence of the digital timer through pin No. 2. The initiation relay senses 12 volts from the engine's cranking circuit once the circuit is energized. Thus, the digital timer does not operate until the cranking circuit is energized. In simplest terms, the timing circuit pulses at a predetermined frequency 12 volts through another relay D to a standard automotive coil circuitry. The 12 volts is supplied to the circuitry condenser which, in turn, supplies approximately 125 volts to the secondary windings of the coil. The primary windings are supplied 12 volts from the electrical system. In turn, 15K volts are supplied from the coil to electrode 24. Applicant has empirically determined that a pulse rate of approximately 1500 pulses/minute is preferred in an automobile emission control device for optimizing reduction of carbon monoxide, hydrocarbons, and carbon dioxide.

The system 10 may include temperature sensitive means B for sensing the temperature within treatment chamber 12 and limiting the pulsed voltage to first screen 18 to within a predetermined temperature range. As diagrammatically indicated in FIGS. 1 and 2, a thermo 42 is operatively disposed so as to sense the temperature within chamber 12 and it is interfaced with control circuit 38 so that the pulsed voltage is only supplied within a predetermined temperature range. Applicant has determined that there is a distinct temperature range within which effective reduction of carbon monoxide, carbon dioxide, and hydrocarbons occur. For the embodiment of system 10 utilized as an emission control device for an automobile, applicant has determined that this temperature range is approximately 150° to 300° F. This temperature range is a mere approximazation and is not meant to limit the present invention to any particular range. The temperature range can be dependent upon any number of factors including which particular gaseous pollutants are desired to be reduced from the gas stream.

Although the present explanation has been primarily concerned with an emission control device for an automobile, the present invention is not limited to such. For example, chamber 12 could be mounted to an industrial effluent stack and supplied pulsed voltage from any number of independent sources for treating the gasses emitted from the stack. The present invention may be utilized in any number of residential and industrial applications and is not limited to an emission control device for an automobile.

While not wishing to be bound to any particular theory, it is believed that when the engine pollutants pass through the first metal screen which is being supplied the pulsed voltage, that a plasma or catalytic reaction is established in or around the wire mesh of the screen. At some relatively high temperature, around 300° F., the reaction appears to be significantly limited. The reaction continues to take place within the chamber around the screens until the temperature in the region of the screen drops below approximately 160° to 150°F. In theory, applicant believes the electric spark supplied to the screen is exciting the metal ion electronic levels on the surface of the stainless steel mesh causing a metallic catalyst reaction between the metal atoms and molecules of gaseous reactants. Applicant refers to pages 211 to 213 of the Encyclopedia of Chemistry, third edition, edited by Clifford A. Hampel and Gessner G. Hawley, for a possible explanation of the reaction in and around the metal screens. Applicant believes that the same reaction takes place around both of the metal screens even though the second metal screen does not necessarily have a direct spark applied thereto. Apparently, the voltage supply to the first screen and heat generated in the chamber is sufficient for promoting the catalytic condition at the surface of the wire mesh on the second screen also. Applicant has determined though that the addition of the second screen improves the reduction of gaseous pollutants within the chamber.

In order to test the present invention, prototype units were tested on various automobiles. The test automobile's emission was first tested with a gas analyzer without the device being activated. After activating the present device, various readings were taken at various temperatures of the treatment chamber. The tables below summarize the results of those tests.

The follow results were obtained using the present device on an '85 Lincoln V8 with an ambient temperature of 71°:

| EFFLUENT EXHAUST GASES | EXHAUST TEMPERATURE | ENGINE RPM |
|---|---|---|
| WITH DEVICE TURNED OFF | | |
| CO 3.85% | 120° | 700 |
| HC 368 ppm | | |
| $CO_2$ 7.40% | | |
| $O_2$ 6.60% | | |
| WITH DEVICE TURNED ON | | |
| CO 3.26% | 132° | 700 |
| HC 328 ppm | | |
| $CO_2$ 6.20% | | |
| $O_2$ 8.90% | | |
| CO 3.70% | 136° | 1500 |
| HC 322 ppm | | |
| $CO_2$ 6.30% | | |
| $O_2$ 8.60% | | |
| CO .21% | 190° | 2000 |
| HC 35 ppm | | |
| $CO_2$ 8.30% | | |
| $O_2$ 8.60% | | |
| CO .16% | 210° | 1885 |
| HC 30 ppm | | |
| $CO_2$ 8.70% | | |
| $O_2$ 7.70% | | |
| CO .22% | 215° | 1900 |
| HC 25 ppm | | |
| $CO_2$ 9.20% | | |
| $O_2$ 7.10% | | |
| CO .16% | 208° | 2000 |
| HC 24 ppm | | |
| $CO_2$ 9.20% | | |
| $O_2$ 7.20% | | |
| CO .23% | 200° | 2000 |
| HC 23 ppm | | |
| $CO_2$ 8.90% | | |
| $O_2$ 5.90% | | |
| WITH DEVICE TURNED OFF | | |
| CO .02% | 200° | 1578 |
| HC 17 ppm | | |
| $CO_2$ 8.30% | | |
| $O_2$ 8.40% | | |
| CO .17% | 220° | 1570 |
| HC 22 ppm | | |
| $CO_2$ 8.40% | | |
| $O_2$ 7.80% | | |
| CO .22% | 210° | 1585 |
| HC 22 ppm | | |
| $CO_2$ 10.00% | | |
| $O_2$ 4.50% | | |
| CO 3.89% | 141° | 783 |
| HC 285 ppm | | |
| $CO_2$ 6.10% | | |
| $O_2$ 8.20% | | |

The following results were obtained using the present device on an '89 Lincoln V8 with an ambient temperature of 71°:

| EFFLUENT EXHAUST GASES | EXHAUST TEMPERATURE | ENGINE RPM |
|---|---|---|
| WITH DEVICE TURNED OFF | | |
| CO 3.85% | 120° | 700 |
| HC 368 ppm | | |
| $CO_2$ 7.40% | | |
| $O_2$ 6.60% | | |
| WITH DEVICE TURNED ON | | |
| CO 3.26% | 132° | 700 |
| HC 328 ppm | | |
| $CO_2$ 6.20% | | |
| $O_2$ 8.90% | | |
| CO 3.70% | 136° | 1500 |
| HC 322 ppm | | |
| $CO_2$ 6.30% | | |
| $O_2$ 8.60% | | |
| CO .21% | 190° | 2000 |
| HC 35 ppm | | |
| $CO_2$ 8.30% | | |
| $O_2$ 8.60% | | |
| CO .16% | 210° | 1885 |
| HC 30 ppm | | |
| $CO_2$ 8.70% | | |
| $O_2$ 7.70% | | |
| CO .22% | 215° | 1900 |
| HC 25 ppm | | |
| $CO_2$ 9.20% | | |
| $O_2$ 7.10% | | |
| CO .16% | 208° | 2000 |
| HC 24 ppm | | |
| $CO_2$ 9.20% | | |
| $O_2$ 7.20% | | |
| CO .23% | 200° | 2000 |
| HC 23 ppm | | |
| $CO_2$ 8.90% | | |

-continued

| EFFLUENT EXHAUST GASES | EXHAUST TEMPERATURE | ENGINE RPM |
|---|---|---|
| $O_2$ 5.90% | | |
| WITH DEVICE TURNED OFF | | |
| CO .02% | 200° | 1578 |
| HC 17 ppm | | |
| $CO_2$ 8.30% | | |
| $O_2$ 8.40% | | |
| CO .17% | 220° | 1570 |
| HC 22 ppm | | |
| $CO_2$ 8.40% | | |
| $O_2$ 7.80% | | |
| CO .22% | 210° | 1585 |
| HC 22 ppm | | |
| $CO_2$ 10.00% | | |
| $O_2$ 4.50% | | |
| CO 3.89% | 141° | 783 |
| HC 285 ppm | | |
| $CO_2$ 6.10% | | |
| $O_2$ 8.20% | | |

The following results were obtained using the present device on a '69 Pontiac Lemans V8 (350 cu. in.) engine:

| EFFLUENT EXHAUST GASES | EXHAUST TEMPERATURE | ENGINE RPM |
|---|---|---|
| WITH DEVICE TURNED OFF | | |
| CO 2.56 | | 620 |
| HC 568 | | |
| CO 2.62 | | 1732 |
| HC 433 | | |
| WITH DEVICE TURNED ON | | |
| CO 1.94 | | 625 |
| HC 107 | | |
| CO 1.62 | | 1763 |
| HC 85 | | |

The following results were obtained using the present device on a 1984 Toyota van, 4 cylinder with an ambient temperature of 55°:

| EFFLUENT EXHAUST GASES | EXHAUST TEMPERATURE | ENGINE RPM |
|---|---|---|
| WITH DEVICE TURNED OFF | | |
| CO .12% | 210° | 1970 |
| HC 35 ppm | | |
| $CO_2$ 12.7% | | |
| $O_2$ 3.6% | | |
| CO .04% | 170° | 794 |
| HC 40 ppm | | |
| $CO_2$ 6.4% | | |
| $O_2$ 11.8% | | |
| WITH DEVICE TURNED ON | | |
| CO .07% | 230° | 1909 |
| HC 12 ppm | | |
| $CO_2$ 10.8% | | |
| $O_2$ 5.6% | | |
| CO .03% | 190° | 775 |
| HC 28 ppm | | |
| $CO_2$ 5.0% | | |
| $O_2$ 13.6% | | |

The following results were obtained using the present device on a '87 Ford truck with a V8 (351 cu. in.) engine with an ambient temperature of 60°:

| EFFLUENT EXHAUST GASES | EXHAUST TEMPERATURE | ENGINE RPM |
|---|---|---|
| WITH DEVICE TURNED OFF | | |
| CO 1.12% | 130° | 795 |
| HC 95 ppm | | |
| $CO_2$ 9.3% | | |
| $O_2$ 7.1% | | |
| CO .95% | 300° | 2086 |
| HC 70 ppm | | |
| $CO_2$ 14.1% | | |
| $O_2$ .06% | | |
| WITH DEVICE TURNED ON | | |
| CO .80% | 210° | 820 |
| HC 60 ppm | | |
| $CO_2$ 9.4% | | |
| $O_2$ 6.8% | | |
| CO 31% | 350° | 2041 |
| HC 34 ppm | | |
| $CO_2$ 14.2% | | |
| $O_2$ .6% | | |

Figure 3A:
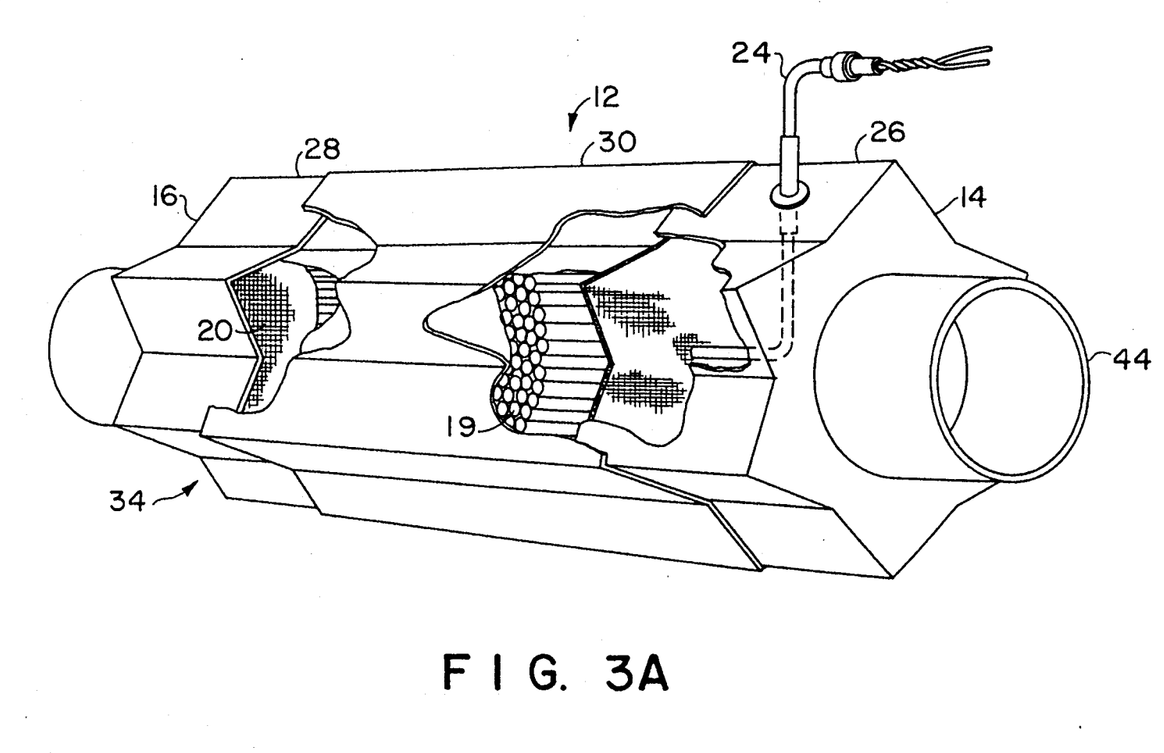
FIG. 3a is an alternative perspective view shown in partial cut-away of the treatment chamber according to the present invention particularly illustrating the substrate disposed between the metal screens.

A preferred embodiment of the present invention is depicted in FIG. 3a. In this embodiment, a perforated premolded chemical substrate 19 is disposed between screens 20 and 18 within the treatment chamber. Presently, the preferred substrate 19 comprises an off-the-shelf item manufactured by Corning of Corning, New York and sold under the product name of "Celcor". The substrate 19 provided by Corning is a honeycomb material chemically comprised of silica (94.5% by weight), sodium oxide (2.15%), alumina (2.1%), magnesia (1.2%), calcium oxide (0.02%), and iron oxide (0.03%). Applicants have found this substrate 19 to be particularly effective in the present embodiment. However, applicants do not wish to limit themselves to this particular substrate nor the chemical composition just recited. Applicant believes that other suitable catalytic type substrates exist and can be used in the invention. The substrate 19 is perforated or otherwise porous so that the exhaust gases flow through the substrate 19 between the two screens.

The embodiment of FIG. 3a is preferred in that the substrate 19 tends to filter and oxidize the exhaust gases between screens. The substrate or strata ensures a complete chemical breakdown of the exhaust gases. Applicant has determined after significant testing of the device that the substrate significantly improves the performance and reliability of the device. Additionally, applicants have determined that inclusion of the substrate has the increased beneficial effect of producing oxygen ($O_2$) during operation of the emission control device. Ozone ($O_3$) is created at the first screen. The substrate tends to oxidize this O-zone and generates oxygen therefrom. The strata also tends to increase carbon dioxide ($CO_2$). However, carbon dioxide is non-toxic and is seen as an indicator of the efficiency of the device. In other words, the increase in carbon dioxide indicates that the device is functioning more effectively. This is a significant improvement over conventional devices in that, with conventional catalytic convertors for example, oxygen is not measurable in the effluent gases unless a fresh air stream is admitted into the device. The present embodiment actually generates and outputs oxygen without a fresh air stream.

As mentioned above, electrode 24 may be disposed through sleeve member 30 or may be disposed through insert section 26. In the embodiment of FIG. 3a, electrode 24 is disposed through insert 26 and faces screen 18. The voltage and frequency supplied by electrode 24 does not change from the previously described embodiments. At present, the preferred electrode is a conventional type spark plug manufactured for use particularly in the emission control device by Stitt Spark Plug Co. However, this is merely a preferred embodiment and not a limitation of the invention. Any manner or configuration of conventional electrode or voltage source may be utilized as electrode 24.

The embodiment illustrated in FIG. 3a utilizing the Celcor substrate from Corning was independently tested on various makes and models of four, six, and eight cylinder vehicles. The following average test results were obtained using a standard Sun-four gas analyzer:

|  | Without Device | With Device |
| --- | --- | --- |
| Carbon Monoxide | .82% | .04% |
| Carbon Dioxide | 8.69% | 8.41% |
| Hydrocarbons | 135 ppm | 31 ppm |

Tests were also conducted on the embodiment of FIG. 3a using a mass-spectrograph which burns gases at a specific flash point thus giving exact percentages of a particular gas.

|  | Without Device | With Device |
| --- | --- | --- |
| Hydrocarbons | 0.171 | 0.108 |
| Ozone | .0001 | .0001 |
| Nitric oxide | 81 | 33 |
| Nitrogen Dioxide | 58 | 29 |
| Carbon Monoxide | 0.323 | 0.136 |

As can be seen from the above test results, the device substantially reduces carbon monoxide from the vehicles once temperature of the exhaust reached 200 degrees fahrenheit.

Another important benefit of the present device is its extremely short start-up time. The device according to the invention can be at full operating conditions in as little as thirty seconds regardless of engine temperature and exhaust gas temperature. With conventional systems, such as catalytic convertors, the primary concern is to rapidly get the system up to a heat necessary to make the convertor functional. Typically this takes four or five minutes of engine warm-up time. The conventional systems are also dependent upon substantial associated power and control equipment for maintaining the operating temperature of the convertor. This equipment substantially draws on the power consumption of the engine and adds additional weight and substantial expense to the entire vehicle. The present invention overcomes these deficiencies in that it operates independent of the engine and, with the exception of the timing circuit, does not require expensive or intricate interfacing controls with the engine. Additionally, most conventional catalytic convertor systems generate a tremendous amount of heat underneath the car, requiring extensive shielding. The present invention operates substantially cooler than conventional catalytic convertors and at a much greater efficiency.

With the embodiment of FIG. 3a, applicant has also determined that the temperature sensing device, or thermocouple 42, is not necessary. The device tends to operate within the optimum temperature range discussed with the electrode 24 pulsing continuously. Thus, in this embodiment, it is not necessary to interface a temperature sensing device with control unit 38 to the pulsing of the voltage source.

It is thus apparent from the above results that gaseous pollutants are either reduced or eliminated from the gas streams by virtue of the present invention. It is also apparent that the reaction occurs at the screens within the preferred temperature range even without the voltage being supplied to the second screen. Applicant believes that, once the metallic ions have been excited to a certain degree, the reaction tends to be self sustaining to a certain extent within the preferred temperature range.

It will be apparent to those skilled in the art that various modifications and variations can be made in the apparatus and method of the present invention without departing from the scope and spirit of the invention. Thus, it is intended that the present invention cover the modifications and variations of this invention provided they come within the scope of the appended claims and their equivalents.

What is claimed is:

1. A system for treating exhaust gases for reducing pollutants therein, said system comprising:
a treatment chamber, said chamber having an intake end and an exhaust end;
a first metal screen operatively disposed within said treatment chamber perpendicular to the axis of said chamber generally nearer said intake end so that an incoming exhaust stream entering said treatment chamber first passes through said first metal screen;
an electrode disposed directly adjacent said first metal screen at a distance therefrom so that upon applying a voltage to said electrode sparks are generated between said electrode and said first metal screen;
means for generating sparks from said electrode to said first metal screen at a predetermined frequency to maximize reduction of exhaust pollutants with said treatment chamber, said spark generating means further comprising:
a voltage source operatively connected to said electrode;
a pulsing mechanism operatively configured with said voltage source to cause the voltage supplied to said electrode from said voltage source to be pulsed at said predetermined frequency; and
a section of perforated chemical substrate disposed within said treatment chamber downstream from said first metal screen so that an exhaust stream passing through said first metal screen subsequently passes through said substrate section.

2. The system as in claim 1, further comprising a second metal screen disposed within said treatment chamber at a predetermined distance from said first metal screen, said substrate section disposed between said first and second metal screens.

3. The system as in claim 1, wherein said substrate section comprises a honeycombed substrate comprising primarily silica.

4. The system as in claim 3, wherein said substrate section further comprises sodium oxide, alumina, magnesia, calcium oxide, and iron oxide.

5. The system as in claim 1, wherein said predetermined frequency is generally 1500 pulses/minute.

6. The system as in claim 2, wherein said treatment chamber comprises a first insert section, a second insert section, and a sleeve member, said first and second insert sections mating with respective ends of said sleeve section, said first metal screen being disposed within said first insert section, and said second metal screen being disposed within said second insert section.

7. The system as in claim 6, wherein said first metal screen is approximately six inches from said second metal screen.

8. The system as in claim 2, wherein said system is configured to be mateable within an automobile's exhaust system.

9. The system as in claim 8, wherein said system is configured to be retro-fitted into conventional automobile exhaust systems.

10. The system as in claim 2, wherein said treatment chamber comprises a multi-sided configuration.

11. The system as in claim 10, wherein said multi-sided configuration is a star shape having generally equal length sides.

12. The system as in claim 2, wherein said first and second metal screens are stainless steel.

13. The system as in claim 2, wherein said system is configured for use in an automobile's exhaust system, said voltage source comprising components of the automobile's existing electrical system, and said pulsing mechanism comprising a timing circuit operatively interfaceable with the automobile's electrical system.

14. The system as in claim 2, further comprising a temperature sensing device operatively disposed to sense temperature within said treatment chamber and interfaced with said pulsing mechanism for causing said voltage to be supplied to said electrode within a predetermined temperature band.

15. The system as in claim 14, wherein said temperature sensing device comprises a thermocouple, said thermocouple disposed so as to respond to temperature of exhaust gasses passing through said treatment chamber.

16. The system as in claim 14, wherein said predetermined temperature band is from generally 150° degrees to 300° degrees Fahrenheit.

17. A device for treating an automobile's exhaust gases to reduce pollutants contained therein, said device comprising:
 a multi-sided treatment chamber configured to be installed in the auto's exhaust system so that exhaust gasses pass through said chamber;
 a first stainless steel metal screen disposed within said treatment chamber, and a second metal screen disposed within said chamber a predetermined distance downstream from said first metal screen, said screens disposed substantially perpendicular to the longitudinal axis of said treatment chamber;
 an electrode disposed directly adjacent said first stainless steel screen at a distance therefrom so that upon applying voltage to said electrode sparks are generated between said electrode and the surface of said first stainless steel screen, said electrode being connectable to a voltage source in the automobile's existing electrical system;
 a timing circuit interfaceable with the automobile voltage source, said timing circuit configured to cause voltage supplied to said electrode to be pulsed at a predetermined frequency causing sparks to be generated between said electrode and said first stainless steel screen; and
 a section of perforated chemical substrate disposed within said treatment chamber between said first and second stainless steel screens.

18. The device as in claim 17, wherein said chamber comprises an insert configurable into an automobile's exhaust system.

19. The device as in claim 17, wherein said electrode is mateable with an automobile's electric ignition system, said timing circuit interfaceable with the electric ignition system.

20. The device as in claim 17, wherein said predetermined frequency is approximately 1500 pulses/minute 21. A method for treating exhaust gasses to reduce the pollutants contained therein, said method comprising the steps of:
 passing the exhaust gasses through a treatment chamber having first and second steel screens disposed therein separated from each other a predetermined distance with a chemical catalytic substrate disposed between the first and second steel screens, the exhaust gasses passing through the first screen, the substrate, and then the second screen;
 supplying voltage to an electrode disposed adjacent the first steel screen within the treatment chamber to generate parks across the gap between the electrode and first screen; and
 pulsing the voltage supplied to the electrode at a predetermined frequency.

22. The method as in claim 21, comprising supplying approximately 15K volts to the electrode.

23. The method as in claim 22, comprising pulsing the voltage at approximately 1500 pulses/minute.

24. The method as in claim 21, comprising supplying the pulsed voltage within a temperature range of approximately 150° to 300° F. within the treatment chamber.

25. The method as in claim 21, wherein said method is used for treating exhaust gasses of an automobile, further comprising disposing the treatment chamber within the auto's exhaust system, supplying the voltage to the electrode from the auto's electrical system, and pulsing the voltage with a timing circuit interfaced with the auto's electrical system.

* * * * *

UNITED STATES PATENT AND TRADEMARK OFFICE
CERTIFICATE OF CORRECTION

PATENT NO.   : 5,419,123
DATED        : May 30, 1995
INVENTOR(S)  : Ben F. Masters It is certified that error appears in the above-identified patent and that said Letters Patent is hereby corrected as shown below:

Claim 20, line 1, insert --.-- after "minute".

Claim 21, line 13, delete "parks" and substitute therefor --sparks.

Signed and Sealed this

Seventh Day of March, 2000

Attest:

Attesting Officer

Q. TODD DICKINSON

Commissioner of Patents and Trademarks